«12» United States Patent
Itoh et al.

US008601272B2

(10) Patent No.: US 8,601,272 B2
(45) Date of Patent: Dec. 3, 2013

(54) SIGNATURE LOG STORING APPARATUS

(75) Inventors: Shinji Itoh, Yokohama (JP); Yoshinori Honda, Kawasaki (JP); Hiroyasu Nunokami, Tokyo (JP); Keiji Sakamoto, Chiba (JP)

(73) Assignee: Hitachi, Ltd., Tokyo (JP)

( * ) Notice: Subject to any disclaimer, the term of this patent is extended or adjusted under 35 U.S.C. 154(b) by 1873 days.

(21) Appl. No.: 11/393,782

(22) Filed: Mar. 31, 2006

(65) Prior Publication Data
US 2007/0083763 A1 Apr. 12, 2007

(30) Foreign Application Priority Data
Oct. 11, 2005 (JP) .................................. 2005-295869

(51) Int. Cl.
*H04L 9/00* (2006.01)
(52) U.S. Cl.
USPC .......................................................... 713/176
(58) Field of Classification Search
USPC ................... 713/175–176, 180–181
See application file for complete search history.

(56) References Cited

U.S. PATENT DOCUMENTS

| 5,956,404 | A | * | 9/1999 | Schneier et al. | 713/180 |
|---|---|---|---|---|---|
| 6,012,087 | A | * | 1/2000 | Freivald et al. | 709/218 |
| 6,021,202 | A | * | 2/2000 | Anderson et al. | 705/54 |
| 6,144,745 | A | * | 11/2000 | Akiyama et al. | 380/232 |
| 6,609,200 | B2 | * | 8/2003 | Anderson et al. | 713/176 |
| 6,681,214 | B1 | * | 1/2004 | Doljack | 705/75 |
| 7,043,636 | B2 | * | 5/2006 | Smeets | 713/170 |
| 7,130,886 | B2 | * | 10/2006 | Little et al. | 709/206 |
| 7,134,021 | B2 | * | 11/2006 | Miyazaki et al. | 713/178 |
| 7,206,939 | B2 | * | 4/2007 | Miyazaki et al. | 713/193 |
| 7,249,258 | B2 | * | 7/2007 | Honda et al. | 713/176 |
| 7,305,558 | B1 | * | 12/2007 | Miyazaki et al. | 713/178 |
| 7,401,225 | B2 | * | 7/2008 | Tanimoto et al. | 713/178 |
| 7,441,115 | B2 | * | 10/2008 | Miyazaki et al. | 713/156 |
| 7,552,335 | B2 | * | 6/2009 | Iwamura | 713/176 |
| 7,574,605 | B2 | * | 8/2009 | Tanimoto et al. | 713/177 |
| 7,694,126 | B2 | * | 4/2010 | Miyazaki et al. | 713/150 |

(Continued)

FOREIGN PATENT DOCUMENTS

| EP | 1 094 424 A2 | 4/2001 |
|---|---|---|
| EP | 1094424 | 4/2001 |

(Continued)

OTHER PUBLICATIONS

Ueda et al., Evaluation of Total Cost in Hysteresis Signature Systems, Oct. 2004, Tokyo Denki University.*

(Continued)

*Primary Examiner* — Fikremariam A Yalew
(74) *Attorney, Agent, or Firm* — Antonelli, Terry, Stout & Kraus, LLP.

(57) ABSTRACT

A signature log storing apparatus includes a signature log list and a certificate list, and registers, in the signature log list, a part of signature information in generated hysteresis signature as a signature record and a part of a user certificate in the certificate list. The signature log storing apparatus further includes a trust point list and validates a signature records registered in the signature log list and registers identification information for identifying a latest signature record out of the validate signature record, evidence information for validating validity of the user certificate for a validated signature record, and a hash value of information derived by connecting the evidence information and the hash value as needed or before the user certificate expires.

10 Claims, 8 Drawing Sheets

(56) References Cited

U.S. PATENT DOCUMENTS

| | | | |
|---|---|---|---|
| 2002/0013825 A1* | 1/2002 | Freivald et al. | 709/218 |
| 2002/0023221 A1* | 2/2002 | Miyazaki et al. | 713/178 |
| 2002/0026425 A1* | 2/2002 | Fahraeus | 705/64 |
| 2002/0038429 A1* | 3/2002 | Smeets | 713/193 |
| 2002/0073276 A1* | 6/2002 | Howard et al. | 711/113 |
| 2002/0099663 A1* | 7/2002 | Yoshino et al. | 705/65 |
| 2003/0172122 A1* | 9/2003 | Little et al. | 709/207 |
| 2003/0182552 A1* | 9/2003 | Tanimoto et al. | 713/170 |
| 2003/0187885 A1* | 10/2003 | Miyazaki et al. | 707/203 |
| 2003/0236992 A1* | 12/2003 | Yami | 713/200 |
| 2004/0006692 A1* | 1/2004 | Honda et al. | 713/157 |
| 2004/0107348 A1* | 6/2004 | Iwamura | 713/176 |
| 2004/0123107 A1* | 6/2004 | Miyazaki et al. | 713/176 |
| 2004/0172540 A1* | 9/2004 | Tanimoto et al. | 713/176 |
| 2005/0148323 A1* | 7/2005 | Little et al. | 455/414.1 |
| 2005/0149442 A1* | 7/2005 | Adams et al. | 705/51 |
| 2005/0172128 A1* | 8/2005 | Little et al. | 713/168 |
| 2005/0177734 A1* | 8/2005 | Tanimoto et al. | 713/186 |
| 2005/0193207 A1* | 9/2005 | Buck | 713/178 |
| 2005/0232421 A1* | 10/2005 | Simons et al. | 380/255 |
| 2005/0234909 A1* | 10/2005 | Bade et al. | 707/8 |
| 2005/0262321 A1* | 11/2005 | Iino | 711/164 |
| 2006/0010095 A1* | 1/2006 | Wolff et al. | 707/1 |
| 2006/0031683 A1* | 2/2006 | Marion et al. | 713/185 |
| 2006/0059357 A1* | 3/2006 | Miyazaki et al. | 713/178 |
| 2007/0288768 A1* | 12/2007 | Nesta et al. | 713/194 |

FOREIGN PATENT DOCUMENTS

| | | |
|---|---|---|
| JP | 11-119650 | 4/1999 |
| JP | 2001-331104 | 11/2001 |
| JP | 2004-104750 | 4/2004 |

OTHER PUBLICATIONS

Masashi Une, How to detect forgery of digital signatures even though leakage of a signing key cannot be detected immediately, Oct. 2004, IWAP 2004.*

Hiroshi Yoshiura et al., Legally Authorized and Unauthorized Digital Evidence, 2004, Springer VERLAG.*

Basin et al., A Formal Analysis of a Digital Signature Architecture, 2004, 6th Conference on Integrity and Internal Control in Information Systems.*

David Basin et al., Specifying and Verifying Hysteresis Signature System with HOL-Z, Jan. 2005.*

Matsumoto et al., Alibi establishment for electronic signatures, Mar. 2000, Information Processing Society of Japan.*

Toyoshima et al., Hysteresis signature and its related technologies to maintain the digital evidence for network activities in future society, 2005, Journal of the National INstitute of Information and Communications Technology.*

D. Pinkas, J. Ross, N. Pope "RFC3126—Electronic Signature Formats for Long Term Electronic Signatures" IETF, Sep. 2001.

Tatsuo Matsuura, "Problem in System Coping with E-Document Law has been Revealed", Nikkei System Integration, Apr. 26, 2005, p. 207-210.

Masashi Une, "Current status and Problem of Digital Time Stamp Technology", IMES Discussion Paper Series, Oct. 1999, No. 99-J-36, p. 11-13.

* cited by examiner

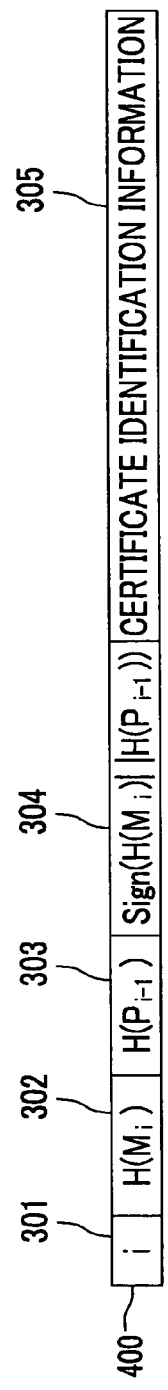

FIG.8

| TRUST POINT ID | SIGNATURE ID LIST | TRUST POINT HASH VALUE | EVIDENCE INFORMATION LIST |
|---|---|---|---|
| 0x0001 | log1_0005, log2_0007, log3_0050 | pL0k7KTPpcaluaX··· | CERTIFICATE AUTHORITY CERTIFICATE, CRL, ··· |
| 0x0002 | log1_0030, log3_0110 | IpbOhvKXJpMekua··· | CERTIFICATE AUTHORITY CERTIFICATE, CRL, ··· |
| ··· | ··· | ··· | ··· |

801 802 803 804

118

SIGNATURE LOG STORING APPARATUS

INCORPORATION BY REFERENCE

This application claims priority based on a Japanese patent application, No. 2005-295869 filed on Oct. 11, 2005, the entire contents of which are incorporated herein by reference.

BACKGROUND OF THE INVENTION

The present invention relates to a signature log storing apparatus, and particularly to a signature log storing apparatus for providing a guarantee for validity of a digital signature.

A technology of digital signatures (hereinafter referred to as "signature") for providing a guarantee for authenticity of an electronic document is based on a cryptography wherein the safety is guaranteed by difficulty in calculation in estimating "private key." Accordingly, the current digital signature can guarantee the authenticity of the electronic document for a relative short period, but cannot always guarantee the authenticity of the electronic document for a long period such as 20 or 30 years. This is because there is a possibility that "private key" can be estimated by technical innovations which improve calculation speeds of computers or cryptanalysis algorisms for a long period. In addition, there is a possibility that "private key" is leaked by a human error in operation.

Once "private key" is passed on a harmful third party, this makes the authenticity of the signature generated with the "private key" cannot be guaranteed. Accordingly, an expiry date is set in a public key, and the validity of the digital signature is guaranteed up to the expiry date. Such digital signatures cannot guarantee the authenticity for electronic documents stored over a long period. To solve this problem, technologies are developed for extending the validity of the digital signatures over the expiry date of the public key certificates.

For example, D. Pinkas, J. Ross, N. Pope, "RFC3126— Electronic Signature Formats for long term electronic signatures", IETF (Internet Engineering Task Force), September 2001, URL<http://www.faqs.org/rfcs/rfc3126.html> (hereinafter referred to as Document 1), discloses a technology for guaranteeing the validity of the digital signature over a long period as follows:

Evidence information (a certificate authority certificate, a CRL (certificate revocation List) and the like) necessary for validating a signature again is previously acquired, and a time stamp is provided to the electronic document, the signature, and the evidence information. Next, a new time stamp is issued again before expiration of the time stamp.

Further, Japanese laid-open patent application publication No. 2001-331104 (hereinafter referred to as Document 2) discloses a technology called the hysteresis signature in which a signature is left as a record upon generation of the signature, and when a new signature is generated, the record of the pervious signature is reflected in the new signature. According to this hysteresis signature technology, a document with the hysteresis signature has validity of the signature for the electronic document which is extended without re-signing for the following electronic documents as long as following documents also have the hysteresis signatures.

Further, it is said that the hysteresis signature technology can improve authenticity in a linkage relationship between signatures by opening a part of a signature log through a public medium such as periodicals such as newspapers and magazines, and websites in the Internet.

SUMMARY OF THE INVENTION

However, the technology disclosed in Document 1, which requires keeping the evidence information for each signature though the evidence in use is the same, needs a large capacity of a memory region to store the evidence information. In addition, because the technology needs to provide new time stamps for the electronic documents, the signatures, the evidence information, and the like before expiration of the time stamps, related electronic documents are stored in removal recording media such as a magnetic tape, and a DVD (Digital Versatile Disk), which provides a load on operation if they are not directly accessible from a computer.

Further, though Document 2 discloses a technology for detecting falsification in the electronic document and the signature after expiration of the public key certificate or when the private key is leaked, it does not disclose a technology for validating the validity of the public key certificate.

The present invention solves the above-mentioned problems, can reduce a capacity of a storage necessary for storing the evidence information and the like and work for operation, and can provide a signature log storing apparatus, a signature log storing method, and its program, capable of validating the validity of the public key certificate even after expiration of the public key certificate or when the private key is leaked.

An aspect of the present invention provides a signature log storing apparatus, including at least a central processing unit and a storage unit, for storing, in the storage unit, a signature log of a hysteresis signature configured to include signature information provided with a linkage relationship defined by a one-way function among a plurality of digital signatures and a user certificate including public key information used for generating the signature information, wherein the storage unit includes a signature log list and a certificate list and registers, when the hysteresis signature is generated, from the generated hysteresis signature, the signature information in the signature log list as a signature record and the user certificate in the certificate list such that the user certificate corresponds to the signature record.

According to this aspect, out of the information included in the hysteresis signature, a part of the signature information is stored in the signature log list as a signature record and a part of the user certificate (public key information) is stored in the certificate list such that the user certificate corresponds to the signature record. Generally, if the user is the same, the user certificate is the same for a plurality of the signatures within the expiry date. This eliminates necessity to store the same user certificates overlapped. Accordingly, a capacity of the storage unit for storing the user certificates can be reduced.

In addition, the storage unit may further includes a trust point list as trust point data for registering information including first identification information for identifying a latest validated signature record out of the signature records registered in the signature log list. Further, the signature log storing apparatus: retrieves a latest signature record out of the signature records registered in the signature log list; validates validity of the latest signature record for the signature records ranging from the retrieved signature records to the signature record identified by the first identification information and validity in a linkage relationship among the signature records ranging from the latest signature record to the signature record identified by the first identification information with the user certificate registered in the certificate list; acquires evidence information for proving validity of the user certificate; validates the validity of the user certificate on the basis of the acquired evidence information being validated; and registers second identification information for identifying the latest signature record, the acquired evidence information, and a hash value of information derived by connecting the signature record identified by the second identification information and the evidence information in the trust point list as the trust point data.

Accordingly, the validity of the signature information and the signature certificate can be validated for the signature records registered in the signature log list before expiration of the user certificate. In addition the evidence information for proving the validity of the user certificate used for the validation is acquired, and the acquired evidence data can be stored as a part of the trust point data in the trust point list. Thus, the validity of the user certificate can be validated even after the expiration date of the certificate has passed or when the private key is leaked.

In addition, the signature log storing apparatus may erase all user certificates registered in the certificate list when new trust point data is registered in the trust point list. Thus, the capacity of the storage unit for storing the user certificate is further reduced.

According to the present invention, the validity of the signature of the electronic document and the user certificate can be validated even after the expiration date of the certificate has passed or when the private key is leaked. In addition, the capacity of the storing unit and the load on the operation can be reduced.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 3 shows an example of a format of the hysteresis signature data of this embodiment according to the present invention.

FIG. 4 shows an example of a format of signature record data of this embodiment according to the invention.

FIG. 8 is a table showing a format of a trust point configuring the trust point list of the embodiment according to the present invention.

DETAILED DESCRIPTION OF THE PREFERRED EMBODIMENTS

Figure 1:
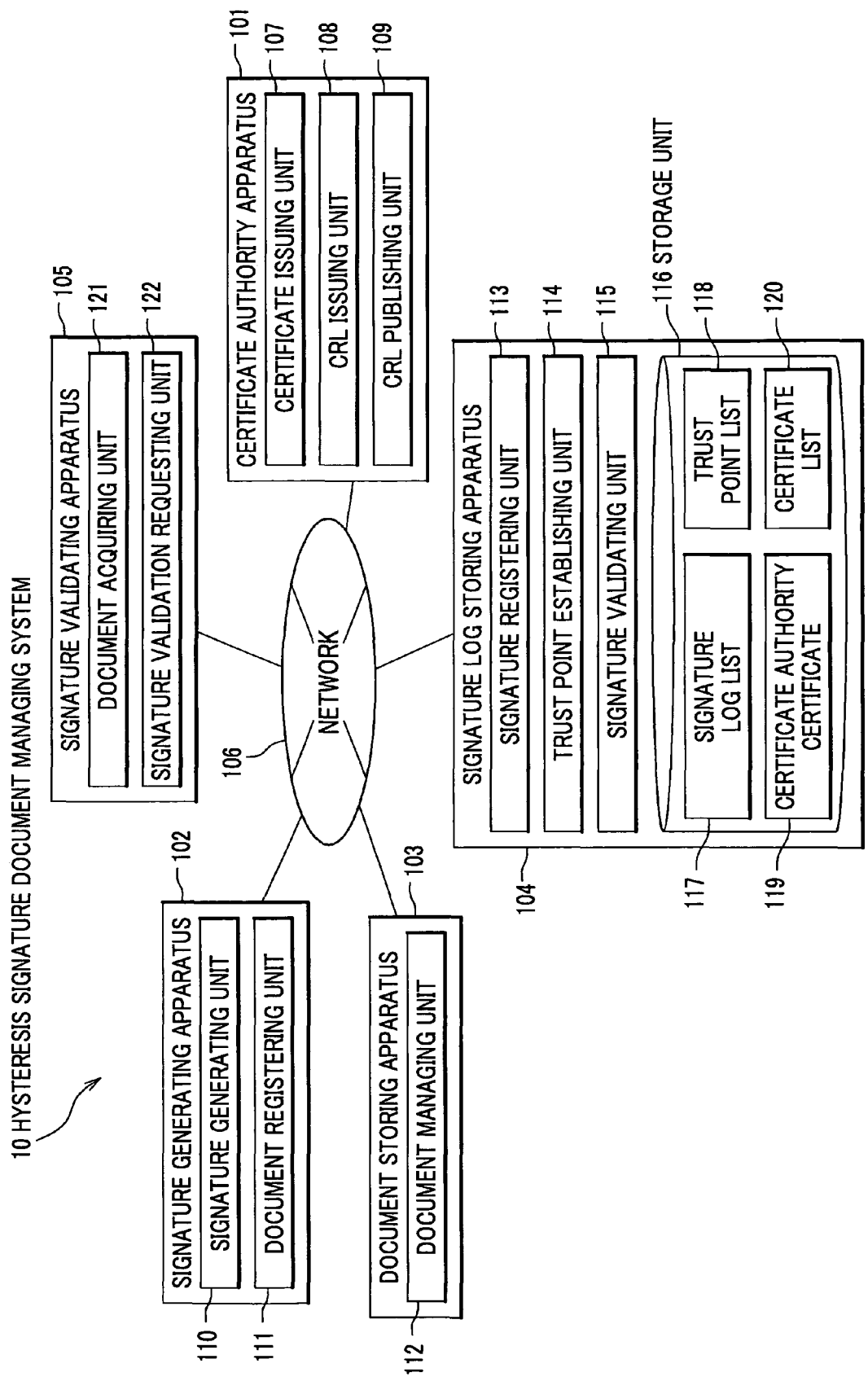
FIG. 1 is a block diagram of an embodiment of a hysteresis signature document managing system using a signature log storing apparatus according to the present invention.

FIG. 1 is a block diagram of an embodiment of a hysteresis signature document managing system using a signature log storing apparatus according to the present invention. As shown in FIG. 1, the hysteresis signature document managing system 10 includes a certificate authority apparatus 101, a signature generating apparatus 102, a document storing apparatus 103, a signature log storing apparatus 104, and a signature validating apparatus 105, which are mutually connected through a network 106 to configure the system. Hereinafter will be described configurations and functions, of the certificate authority apparatus 101, the signature generating apparatus 102, the document storing apparatus 103, the signature log storing apparatus 104, and the signature validating apparatus 105.

In FIG. 1, the certificate apparatus 101 is a computer including at least a CPU (Central Processing Unit) and a storage unit to have functional blocks such as a certificate issuing unit 107, a CRL (certificate revocation list) issuing unit 108, and a CRL publishing unit 109.

The certificate issuing unit 107 generates a private key for a hysteresis signature, as well as a public key certificate corresponding to the private key. The CRL issuing unit 108 manages certificate revocation information of issued public key certifications, as well as periodically issues a CRL. The CRL publishing unit 109 has a function of publishing the CRL issued to signers and validating parties.

Next, the signature generating apparatus 102 is a computer including at least a CPU and a storage unit to have functional blocks such as a signature generating unit 110, and a document registering unit 111.

The signature generating unit 110 generates and provides a hysteresis signature for an electronic document to be provided with the hysteresis signature. The document registering unit 111 registers the electronic document and the hysteresis signature generated by the signature generating unit 110 for the electronic document in the document storing apparatus 103.

The signature generating apparatus 102 stores, at a predetermined region of the storage unit, data necessary for generating the signature (the private key, the public key certificate, a hysteresis signature generated last time (hereinafter referred to as "previous signature")). The signature generating unit 110 receives the data and the corresponding electronic document as input to generate the hysteresis signature. A data format for the generated hysteresis signature will be described later with reference to FIG. 3.

As another embodiment, the data (the private key, the public key certificate, the previous signature) necessary for generating these signatures may be stored in an external storage medium such as an IC card without storing in the signature generating apparatus 102. In addition, the data may be acquired from the signature log storing apparatus 104 when the signature is generated. As a further embodiment, the signature generating apparatus 102 may acquire a time stamp issued by a third party (for example, see RFC3161) and provide the acquired time stamp to the hysteresis signature.

The document storing apparatus 103 is a computer including at least a CPU and a storage unit to have functional blocks such as a document managing unit 112.

The document managing unit 112 accumulates and manages, at a predetermined region of the storage unit, the data of the electronic documents, the hysteresis signatures, and other data regarding the electronic documents (for example, a storing period, a date when the document is prepared). Further, the document managing unit 112 registers data such as the electronic document and supplies the data of the registered document and the like in response to a request from a user or another apparatus as a part of the function of managing the data such as the electronic document.

The signature log storing apparatus 104 is a computer including at least a CPU and a storage unit to have functional blocks such as a signature registering unit 113, a trust point establishing unit 114, and a signature validating unit 115. The signature log storing apparatus 104 has a region for recording or storing data necessary for validation of the hysteresis signature such as a signature log list 117, a trust point list 118, a certificate authority certificate 119, and a certificate list 120. In this specification, the public key certificate in the certificate authority apparatus 101 is referred to as "certificate authority certificate", and the public key certificate for the user registered in the signature log storing apparatus 104 is referred to as "user certificate" or simply "certificate."

The signature registering unit 113 registers information included in the hysteresis signature generated by the signature generating apparatus 102 in the signature log list 117 and the certificate list 120. Further, the trust point establishing unit 114 generates trust point data on the basis of the record data of the hysteresis signature included in the signature log list 117 and registers the generated trust point data in the trust point list 118. In addition, the signature validating unit 115 validates the hysteresis signature with data such as the signature log list 117, the trust point list 118, the certificate authority certificate 119, and the certificate list 120.

Will be described in details later a flow of processing for providing each function of the signature registering unit 113, the trust point establishing unit 114, and the signature validating unit 115 with reference to FIGS. 5 to 7, and 9. In addition, will be described later in details configurations of the signature log list 117 and the trust point list 118 with reference to FIGS. 4 and 8, respectively.

In addition, although not shown, the signature log storing unit 104 has a functional block for receiving a registering request of the hysteresis signature from more than one signature generating apparatus 102 and a functional block for managing a plurality of signature logs.

The signature validating apparatus 105 is a computer including at least a CPU and a storage unit to have functional blocks such as a document acquiring unit 121 and a signature validation requesting unit 122.

The document acquiring unit 121 acquires the electronic document to be validated and a hysteresis signature of the electronic document from the document storing unit 103. The signature validation requesting unit 122 requests the signature log storing unit 104 for validation of the hysteresis signature.

In this embodiment, two validating processes of validating validity in a relationship between the electronic document and the hysteresis signature (hereinafter, referred to as "simple validation") and validating validity in a linkage relationship in the hysteresis signature using the signature log (hereinafter, referred to as "log validation") are included. Out of them, the simple validation may be performed by the signature validating apparatus 105. Further, acquiring the data necessary for validation from the signature log storing apparatus 104 allows the signature validating apparatus 105 to perform both the simple validation and the log validation.

Figure 2:
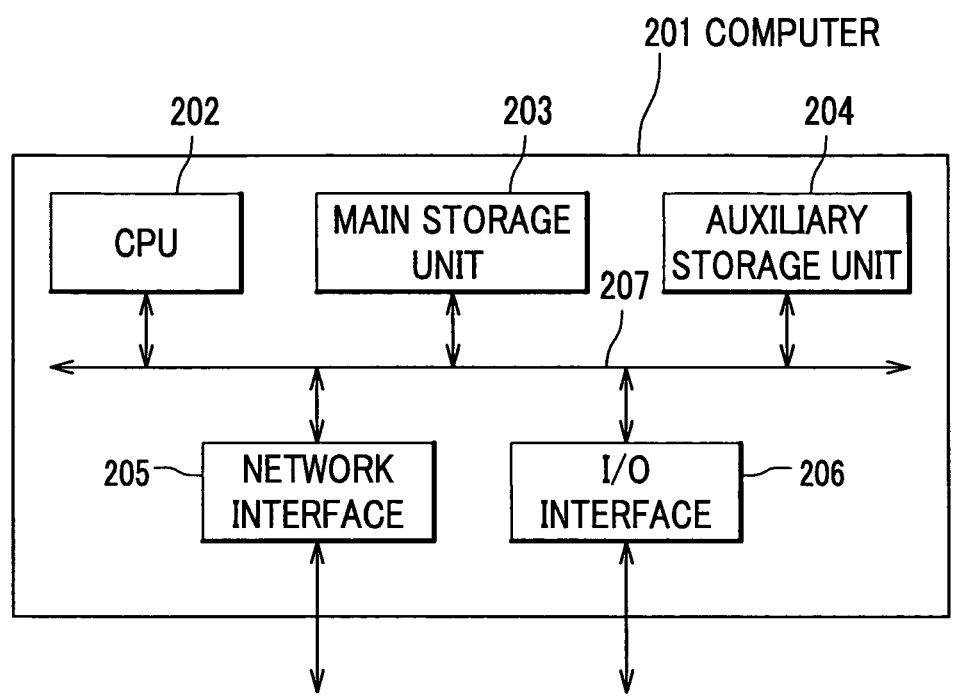
FIG. 2 is a block diagram of an example of computers used in this embodiment.

FIG. 2 shows an example of a general configuration of the computers used in this embodiment. As shown in FIG. 2, the computer 201 is configured to include a CPU 202, a main storage unit 203, an auxiliary storage unit 204, a network interface 205, an I/O interface 206, and the like, which are mutually connected through an internal bus 207. In this specification, if the main storage unit 203 and the auxiliary storage unit 204 are generally called, they are simply called "storage unit."

The main storage unit 203 is configured with a RAM (Random access Memory) of a semiconductor memory and the like, and the auxiliary storage unit 204 is configured with a nonvolatile memory including a recording medium such as a hard disk, a CD-ROM (Compact Disk Read Only Memory), and a DVD (Digital Versatile Disk). The network interface 205 is a connection circuit for connecting the network 106 such as the Internet or a LAN (Local Area Network) to the internal bus 207. The I/O interface 206 is a connection circuit for connecting input/output units, such as a display monitor, a mouse, and a keyboard, to the internal bus 207.

The certificate authority apparatus 101, the signature generating apparatus 102, the document storing apparatus 103, the signature log storing apparatus 104, and the signature validating apparatus 105 shown in FIG. 1 are configured with, for example, the computer shown in FIG. 2. The functions of each functional block in each apparatus are provided by executing with the CPU 202 a predetermined program loaded in the main storage unit 203. Here, the predetermined program is generally stored in the auxiliary storage unit 204 and is loaded in the main storage unit 203 before execution.

In this embodiment, as shown in FIG. 1, the signature generating apparatus 102, the document storing apparatus 103, the signature log storing apparatus 104, and the signature validating apparatus 105 are provided using different computers. However, these apparatuses may be provided using one computer. In addition, more than one apparatus may be provided using one computer. However, the validating apparatus 101 is not provided using the same computer together with any of these apparatuses.

Next, will be described a format of the hysteresis signature data and a format of the signature log list 117 for recording and storing the hysteresis signature data of this embodiment with reference to FIGS. 3 and 4. FIG. 3 shows an example of the format of the hysteresis signature data of this embodiment according to the present invention. FIG. 4 shows an example of a format of the signature record data of this embodiment according to the invention. Here, the signature record data is each piece of the hysteresis signature data recorded in the signature log list 117 (actually, as described later, data derived by removing data of the user certificate from the hysteresis signature data).

As shown in FIG. 3, the hysteresis signature data 300 is configured to have: [1] a signature ID 301 represented by "i"; [2] a hash value 302 for an electronic document "Mi" to be signed, represented by "H(Mi)"; [3] a hash value 303 for the signature record data "Pi−1" corresponding to the previous signature (having serial number of "i−1"); [4] a signature value 304 for data derived by connecting the hash value 302 represented by "H (Mi)" and the hash value 303 represented by "H (Pi−1); [5] certificate identification information 305 for uniquely identifying a user certificate 306; and the user certificate 306.

Here, H(x) is referred to as a hash function for generating a fixed length value from input data of a given length. From a safety viewpoint for information, it is desirable to use such a hash function that it is difficult to find out two pieces of different input data giving the same output value and it is difficult to find out input data giving a given output value. Here, it is allowed that a calculation algorithm for the hash function has been opened.

Further, the signature ID 301 is configured by connecting identification information (signature log ID) for identifying the signature log list 117 including the corresponding hysteresis signature and a serial number within the signature list 117 (for example, the signature log ID_the serial number). Including the signature log ID in the signature ID 301 makes it possible to uniquely identify the signature log list 117 with the signature ID 301 though there are a plurality of signature log lists 117.

In addition, the certificate identification information 305 includes an issuance source, possessor, and serial number of a public key certificate. Further, the hysteresis signature data 300 may include a part or the whole of a time stamp issued by a third party.

Next, as shown in FIG. 4, the signature record data 400 is data derived by removing the user certificate 306 from the hysteresis signature data 300. Accordingly, the signature record data 400 is configured to have: [1] the signature ID 301 represented by "i"; [2] the hash value 302 of the electronic document "Mi", represented by "H(Mi)"; [3] the hash value 303 of the signature record data "Pi−1" corresponding to the previous signature (having the serial number "i−1"); [4] the signature value 304 represented by "Sign (H(Mi)∥H(Pi−1))" corresponding to the data derived by connecting the hash value 302 represented by "H (Mi)" and the hash value 303 "H (Pi−1)"; and [5] the certification identification information 305 for uniquely identifying the user certificate 306. In addition, in the event, the signature record data 400 may include a part or the whole of time stamp issued by a third party.

In this embodiment, when the hysteresis signature of the electronic document is generated in the signature generating apparatus 102, the signature generating apparatus 102 requests the signature log storing apparatus 104 for registering the hysteresis signature. The signature log storing apparatus 104 registers, in response to the request, the hysteresis signature data 300 in the signature log list 117. However, actually, the signature log storing apparatus 104 registers, in the signature log list 117, the signature record data 400 derived by removing the user certificate 306 out of the hysteresis signature data 300.

The user certificate 306 included in the hysteresis signature data 300 is not registered in the signature log list 117, but recorded in the certificate list 120. Generally, it is frequent that the user certificate 306 is commonly used for a plurality of electronic documents. However, recording the user certificate 306 in the certificate list 120 can avoid recording the same user certificate 306 overlapped. In addition, as mentioned later, the user certificate 306 stored in the certificate list 120 is erased whenever the trust point is established. As a result, a capacity of a recording region in use can be more largely reduced than the case where the user certificate 306 would be included in the signature record data 400 and stored in the signature log list 117.

In this embodiment, the signature log list 117 is generated for each signature generating apparatus 102. For example, if it is assumed that there are two signature generating apparatuses 102, two signature log lists 117 exist in the signature log storing apparatus 104. In this case, the signature ID 301 has, for example, such forms that one is "log1_0001" and the other is "log2_0001" derived by combining the signature log ID and the serial number. In addition, as a still further embodiment, the signature log list 117 is generated for each user. In this case, in the signature log storing apparatus 104, the signature log lists 117 are generated by the number of the users. Thus, the signature ID 301 has a format "user1_0001" by combining the user ID and the serial number.

As mentioned above, in this embodiment, when generating the signature record data 400 from the hysteresis signature data 300 and registering it in the signature log list 117, the signature log storing apparatus 104 can judge which one of the signature log lists 117 is selected for registration. Further, another embodiment allows that, for the user or the signature generating apparatus 102 who requested for signature registration, the signature log storing apparatus 104 performs user authentication or apparatus authentication and registers the signature record data 400 in the signature log list 117 assigned to the authenticated user or apparatus.

Will be described a flow of a signature registering process executed by the signature log storing apparatus 104 as a function of the signature registering unit 113 with reference to FIG. 5. This process is executed in response to a request from the signature generating apparatus 102 when the hysteresis signature of the electronic document is generated during generation of the signature.

Figure 5:
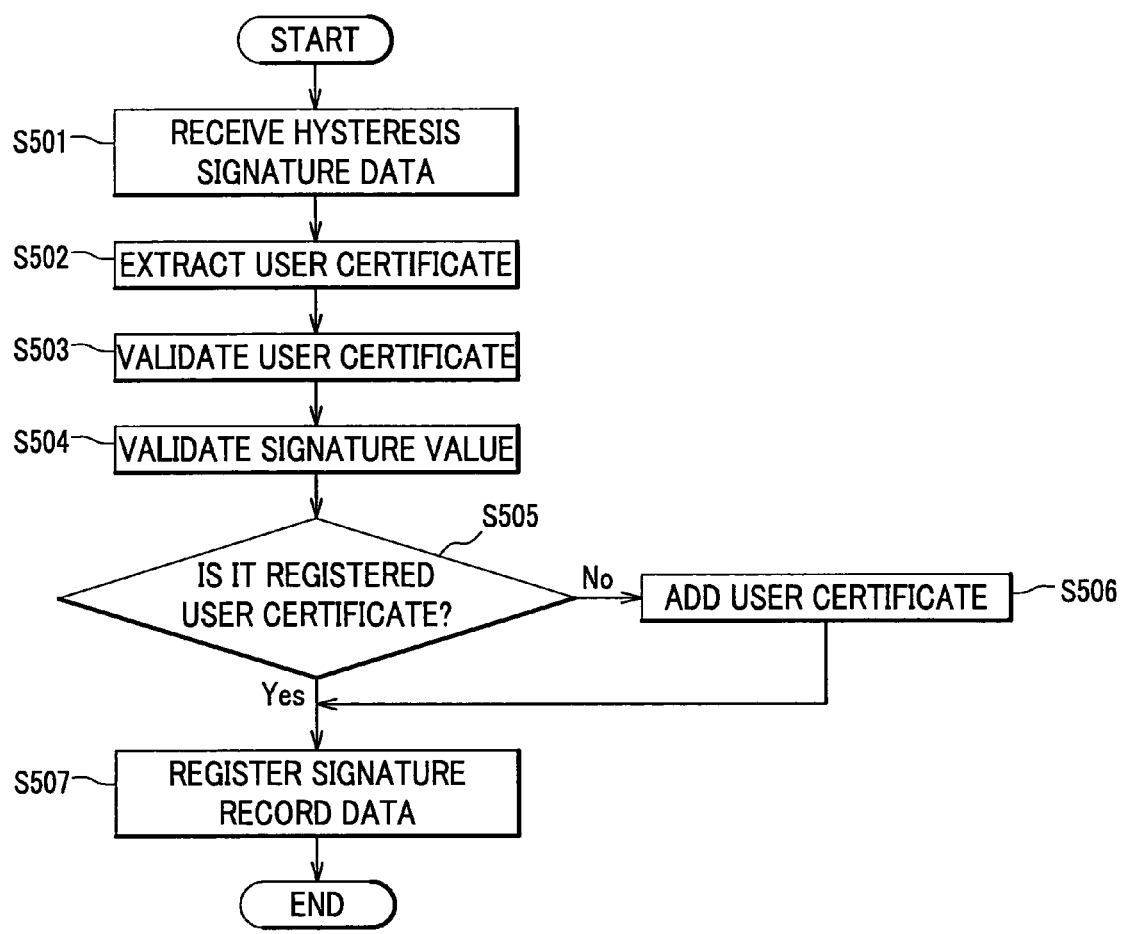
FIG. 5 shows a flow of a signature registering process executed by the signature log storing apparatus of this embodiment.

In FIG. 5, the signature log storing apparatus 104 first receives the hysteresis signature data 300 transmitted from the signature generating apparatus 102 in a step S501. After that, the signature log storing apparatus 104 extracts the user certificate 306 included in the received hysteresis signature data 300 in a step S502.

Next, the signature log storing apparatus 104 validates, in a step S503, the user certificate 306 extracted in the step S502. The validation process includes respective processes for validating an authentication pass, checking an expiration date, and confirming revocation to treat the certificate authority certificate 119 stored in the storage unit 116 as a trust anchor. In addition, to confirm the revocation, the signature log storing apparatus 104 acquires the CRL opened by the certificate authority apparatus 101 and inspects it. When failing in these validations, the signature log storing apparatus 104 returns an error to the signature generating apparatus 102 and the signature registering process is finished (not shown).

Next, the signature log storing apparatus 104 validates the signature value of the hysteresis signature with the public key included in the user certificate 306 in a step S504. Because the hysteresis signature data 300 includes the hash value 302 represented by "H (Mi)" for the electronic document "Mi" to be signed and the hash value 303 represented by "H (Pi−1)" for the signature record data represented by "P i−1" having a serial number (i−1), the signature value can be validated though the electronic document to be signed does not exist. When failing in this validation, the signature log storing apparatus 104 returns an error to the signature generating apparatus 102, and then the signature registering process is finished (not shown).

Next, the signature log storing apparatus 104 judges whether the user certificate 306 is one that has been registered in the certificate list 120 in a step S505. If the user certificate 306 has been registered (Yes in the step S505), the signature log storing apparatus 104 removes the user certificate 306 from the hysteresis signature data 300 to generate the signature record data 400 and registers the signature record data 400 in the signature log list 117 in a step S507. On the other hand, if the user certificate 306 has not been registered (No in the step S505), the signature log storing apparatus 104 adds the user certificate 306 to the certificate list 120 in a step S506. After that, the signature log storing apparatus 104 removes the user certificate 306 from the hysteresis signature data 300 to generate the signature record data 400 and registers the signature record data 400 in the signature log list 117 in the step S507.

In addition, a further embodiment allows that, if the hysteresis signature data 300 includes the time stamp, a validation process of the time stamp is performed after the signature validation process in the step S504.

Figure 6:
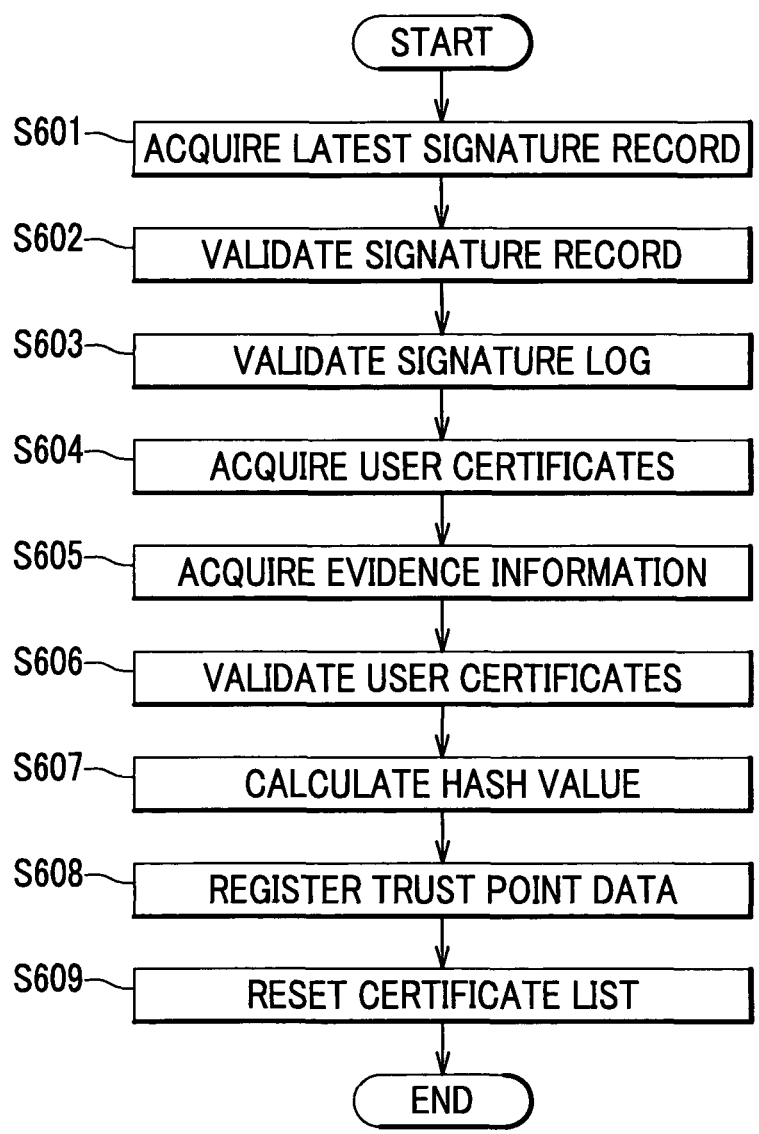
FIG. 6 shows a flow of the trust point establishing process executed by the signature log storing apparatus of this embodiment.
Figure 7:
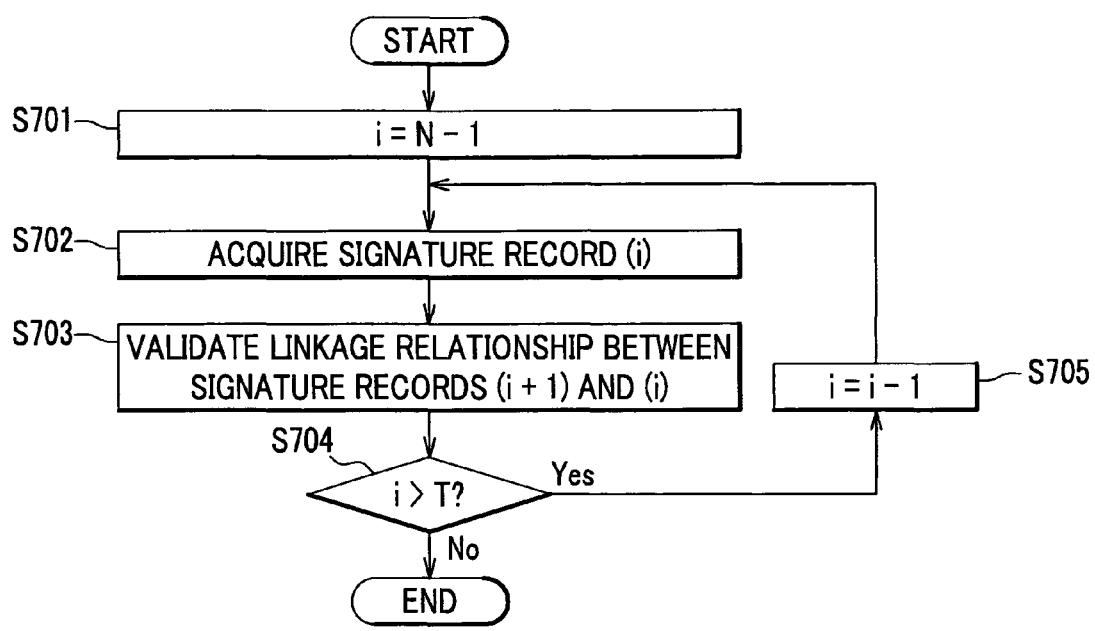
FIG. 7 shows a detailed flow of a signature log validating process included in a trust point establishing process.

Next will be described a flow of a trust point establishing process executed by the signature log storing apparatus 104 as a function of the trust point establishing unit 114 with reference to FIGS. 6 and 7. FIG. 6 shows the flow of the trust point establishing process executed by the signature log storing apparatus 104 of this embodiment. FIG. 7 shows a detailed flow of a signature log validating process included in the trust point establishing process.

Here, the trust point is information indicating a piece of signature record data 400, recorded in the signature log list 117, which indicates the latest signature record data 400 when the validation is performed out of pieces of the signature record data 400 which have been subject to the single validation and the log validation (for example, the signature ID 301). The trust point data includes, as mentioned later, evidence data and the like used in the validation. Accordingly, the trust point establishing process is a process for the single validation and the log validation for the signal record data 400 and for generating and storing the trust point data. Thus, it is desirable to execute the trust point establishing process periodically, for example, daily and weekly. However, if a procedure for the expiry date or for revocation is performed, it should be executed before such event occurs.

Here, first, will be described a flow of the trust point establishing process in a case that the signature log list 117 is single in the signature log storing apparatus 104. In a description below, to avoid complication, each piece of the signature record data 400 recorded in the signature log list 117 is simply referred to as "signature record."

In FIG. 6, the signature log storing apparatus 104 acquires, in a step S601, the latest signature record out of signature records after the trust point was established at the previous chance with reference to the signature log list 117. If the signature record is not added after the trust point is previously established, an error is returned and the trust point establishing process is finished (not shown).

Next, the signature log storing apparatus 104 performs, in a step S602, the signature record validation for the latest signature record acquired in the step S601. In the signature record validation, the user certificate stored in the certificate list 120 is identified with the certificate identification information 305 included in the corresponding signature record, and validity of the corresponding signature record is validated with the identified user certificate and with the hash values 302 and 303, and the signature value 304 included in the corresponding signature record itself. Next, when succeeding in the signature validation, the signature log storing apparatus 104 proceeds to the next step S603. When failing, the signature log storing apparatus 104 returns the signature ID 301 of the corresponding signature record, and the trust point establishing process is finished (not shown).

In addition, a still further embodiment allows that, when filing in the signature record validation, the latest signal record mentioned above is canceled, and the process after the step S602 is executed as a signature record that is prior to the latest record is dealt as the latest signature record.

Next, the signature log storing apparatus 104 performs validation of the validity in the linkage relationship among the signature records ranging from the latest signature record acquired in the step S601 to the signature record identified by the point of the trust point previously established, i.e., performs a signature log validation in step S603. Here, a description regarding FIG. 6 is interrupted, and will be described details of the signature log validation process in the step S603 with reference to FIG. 7.

In FIG. 7, the signature log storing apparatus 104 performs a substitution such that a counter variable i is made i=N−1 in a step S701. Here, N is a value representing a serial number included in the signature ID of the latest signature record. After that, the signature log storing apparatus 104 acquires the signature record (i) from the signature log list 117. Next, the signature log storing apparatus 104 validates that the hash value of the sinecure record (i) included in the signature record (i+1) accords with an actual hash value of the previous signature record (i) in a step S703. When succeeding in this validation, the signature log storing apparatus 104 proceeds to a step S704. When failing, the signature log storing apparatus 104 returns the signature ID 301 of the signature record (i), and then, the signature validation process is finished (not shown).

Next, the signature log storing apparatus 104 checks, in a step S704, whether is the counter variable i>T. Here, T is a value indicating a serial number included in the signature ID of the signature record that is a previous trust point. As a result of the check, if i>T (Yes in the step S704), the counter variable i is made i=i−1 in a step S705, and then the signature log storing apparatus 104 returns to the step S702 to again execute the processes after the step S702. In addition, unless i>T (No in the step S704), that is, when i=T, the signature log validation process is finished.

Returning to FIG. 6, when finishing the signature log validation process in the step S 603, the signature log storing apparatus 104 acquires all user certificates registered in the certificate list 120 in step the S604. Next, the signature log storing apparatus 104 acquires the certificate authority certificates 119 and the CRL necessary for validating each user certificate as evidence information from the certificate authority apparatus 101 in the step S605. In this event, if all user certificates are issued by the same certificate authority unit 101, one certificate authority certificate 119 and one CRL are sufficient. In a case that the user certificates are issued by a plurality of different certificate authority apparatuses 101, this case requires certificate authority certificates 119 and CRL by the number which is the same as the number of the certificate authority apparatuses 101.

Next, the signature log storing apparatus 104 validates, in a step S606, whether the user certificates are valid and are not revoked using the certificate authority certificate 110 and the CRL acquired in the step S605. In this validation, if there is any user certificate which fails in the validation, the signature log storing apparatus 104 returns the identification information of the user certificate which fails in the validation and proceeds to the next step. In addition, because this case is not of falsification of the signature log list 117, but of failure in the validation of the user certificate, the action is limited to return of information indicating the failure in the validation. Another embodiment permits termination of the trust point establishing process after simply returning an error upon the failure of the validation.

Next, the signature log storing apparatus 104 calculates, in a step S607, a hash value of the data derived by connecting the latest signature record and the evidence information including the certificate authority certificate 119 and the CRL. The signature log storing apparatus 104 registers the evidence information including a trust point ID, the signature ID of the latest signature record, the certificate authority certificate, the CRL, and the like and the hash value calculated in the step 607 as trust point data in the trust point list 118 in a step S608. In addition, the trust point ID is identification information for uniquely identifying the trust point data generated in this step.

At the last, the signature log storing apparatus 104 deletes all user certificates registered in the certificate list 120, that is, resets the certificate list 120 in step S609, returns the trust point ID and the hash value, and finishes the trust point establishing process.

Next, the flow of the trust point establishing process will be complementarily described for a case that a plurality of signature log lists 117 exist in the signature log storing apparatus 104.

The signature log storing apparatus 104 acquires the latest signature records for each signature log in the step S601. In this event, the signature log storing apparatus 104 acquire no signature record for some of the signature log lists 117 which is not updated since the trust point is previously established. For example, in a case that there are M signature log lists 117, if it is assumed that there are L signature log lists 117 to which no new signature records are added, a new latest signature record is acquired from each of (M−L) signature log lists 117 with a result that total (M−L) new signature records are acquired.

Next, the signature log storing apparatus 104 executes the process from the step S602 (signature record validation) to the step S603 (signature log validation) for each signature log list 117. Next, the signature log storing apparatus 104 executes the process from the step S604 (user certificate acquisition) to the step S606 (user certificate validation). After that, the signature log storing apparatus 104 calculates, in the step S607 (hash value calculation), the hash value of data derived by connecting the (M−L) latest signature records acquired in the step S601 (signature record acquisition) and the evidence information including the certificate authority certificate 119, the CRL, and the like.

In this embodiment, if there are a plurality of the signature logs, it is assumed that the number of pieces of the trust point data is one. Thus, in the step S608, the signature log storing apparatus 104 causes the (M−L) latest signature records to be included in the trust point data and registers the trust point data in the trust point list 118. At the last, the signature log storing apparatus 104 executes the process in the step S609.

In addition, it is desirable to open the hash values and the trust point ID acquired in the above-mentioned trust point establishing process in an open medium such as publications such as newspapers and magazines, websites, or other periodical publications. Opening enables validation regarding a presence or absence of falsification in the trust point data in the trust point list 118.

FIG. 8 is a table showing a format of the trust point configuring the trust point list of the embodiment according to the present invention. As shown in FIG. 8, the trust point data includes the trust point ID 801, a signature ID list 802, a trust point hash value 803, and an evidence information list 804.

The trust point ID 801 is identification information enabling the corresponding trust point data to be uniquely identified within the trust point list 118. Further, the signature ID list 802 is a list of the latest signature ID acquired at the trust point establishment. In addition, the trust point hash value 803 is a hash value calculated when the trust point is established (see, the step S607 in FIG. 6). Furthermore, the evidence information list 804 is a list of the certificate authority certificate 119, the CRL, and the like that are acquired and used when the trust point is established.

In addition, though hash values opened on newspapers cannot be used, the trust point hash value 803 in the trust point list 118 can be used as a trust anchor as long as a simple validation is performed. Further, a system which always uses the hash values opened on newspapers or the like allows the trust point list 118 to have no trust point hash value 803.

Further, the evidence information list 804 may include an OCSP (Online Certificate Status Protocol) response, an ARL (Authority Revocation List), the user certificate, and the like. Furthermore, in a case that the hysteresis signature includes the time stamp, a further embodiment allows the evidence information list 804 to include a certificate relating to the time stamp.

Figure 9:
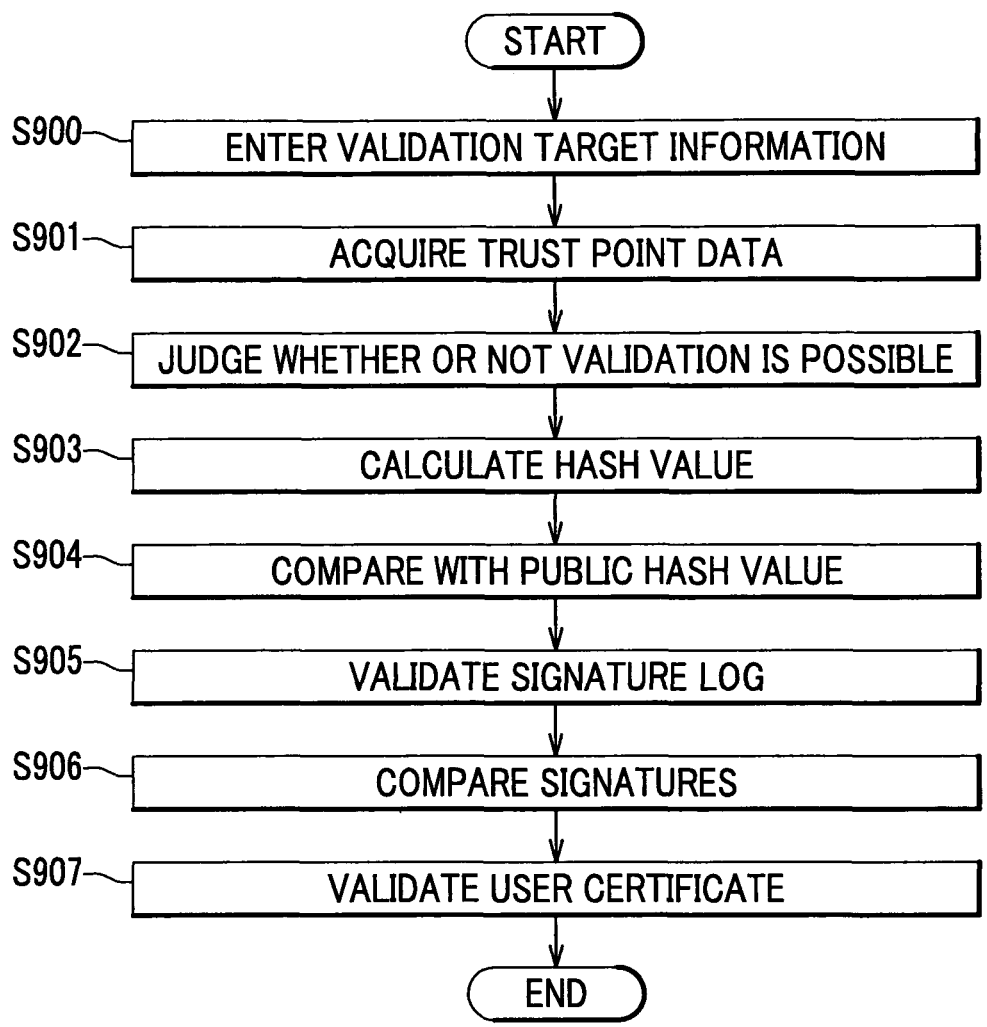
FIG. 9 shows a flow of a signature validation process, which the signature log storing apparatus executes, of the embodiment.

With reference to FIG. 9, will be described a flow of the signature validating process which the signature log storing apparatus 104 executes as a function of the signature validating unit 115. FIG. 9 shows a flow of the signature validation process which the signature log storing apparatus 104 of this embodiment executes. This process is executed in response to a request from the signature validation apparatus 105 when a signature validation request occurs in the signature validating apparatus 105.

In FIG. 9, the signature log storing apparatus 104 first enters validation target information such as the hysteresis signature, the trust point ID, and the hash value of the trust point in a step S900. In this event, the signature log storing apparatus 104 uses values appearing in a newspaper of an open source for the trust point ID and the trust point hash value. Next, the signature log storing apparatus 104 acquires, in a step S901, the signature ID list 802 and the evidence information list 804 from the trust point data identified by the trust point ID entered in the step S900 with reference to the trust point list 118.

After that, the signature log storing apparatus 104 judges whether validation of the entered hysteresis signature is possible or impossible from the entered trust point ID and the trust point hash value in a step S902. More specifically, if the signature ID (ID1) included in the entered hysteresis signature and the signature ID (ID2) included in the signature ID list 802 are included in the same signature log list 117 and the signature ID (ID2) is later than the signature ID (ID1), the validation is judged to be possible. Here, the judgment whether they are included in the same signature log list 117 is performed by comparing the signature log ID of the signature ID. In this judgment, if the validation is possible, the signature log storing apparatus 104 proceeds to the next step, and if the validation is impossible, the signature validating process is finished as an error (not shown).

Next, the signature log storing apparatus 104 acquires, in a step S903, the signature record identified by the signature ID listed in the signature ID list 802 from the signature log list 117 to calculate the hash value of the data derived by connecting the acquired signature record and the evidence information list 804. The signature log storing apparatus 104 compares, in a step S904, the hash value calculated in the step S903 with the hash value of the trust point entered in the step S900, namely, the opened hash value. As a result, when both the hash values are identical with each other, the signature log storing apparatus 104 proceeds to the next step. If they are not identical with each other, the signature validating process is finished as an error (not shown).

Next, the signature log storing apparatus 104 performs, in a step S905, validation of the signature log from the signature ID (ID2) included in the trust point to the signature ID (ID1) to be validated. In this event, the signature log to be validated is identified with the signature ID included in the entered hysteresis signature data 300. This signature log validation process is substantially the same as the flow shown in FIG. 7. The difference is in that T is a value derived by subtracting one from a value of the signature ID of the hysteresis signature data 300 to be validated.

Next, the signature log storing apparatus 104 compares the entered hysteresis signature with the corresponding signature record in the signature log list 117 in a step S906. Here, in this comparison, as shown in FIGS. 3 and 4, the signature record data 400 has a format in which the user certificate 306 is removed from the hysteresis signature data 300, so that common parts of data except the user certificate 306 are compared. As a result, if both are identical with each other, the signature log storing apparatus 104 proceeds to the next step. If they are not identical, the signature validation process is finished as an error (not shown).

Next, the signature log storing apparatus 104 validates the user certificate with the certificate authority certificate, the CRL, and the like included in the evidence information list 804 in a step S907. The validation includes validation with a public key included in the certificate authority certificate and inspecting whether the user certificate is included in the CRL. Here, the check of the expiration date of the certification is not performed As mentioned above, though the expiration date of the public key certificate has passed, or the private key is leaked, the validity of the hysteresis signature accompanied with the electronic document and the user certificate (public key certificate) can be validated. In this case, because before the expiration date of the public key certificate becomes, it is unnecessary to newly acquire the public key certificate and the time stamp for each electronic document, it is enabled to omit the load on operation of the system. Further, it is unnecessary to store the user certificate for each electronic document of the signature record, which can largely reduces the region for storing the user certificate.

The specification and drawings are, accordingly, to be regarded in an illustrative rather than a restrictive sense. It will, however, be evident that various modifications and changes may be made thereto without departing from the spirit and scope of the invention as set forth in the claims.

We claim:

1. A signature log storing apparatus, including at least a central processing unit and a storage unit, for storing a signature log of a hysteresis signature configured to include a signature record provided with a linkage relationship defined by a one-way function between a previous signature and a new signature, wherein the hysteresis signature is generated by leaving the previous signature as a log upon generation of the previous signature, generating the new signature by reflecting the log of the previous signature in the new signature, and generating the hysteresis signature in the process of generating the new signature, and a user certificate including public key information used for generating the signature record, wherein the storage unit includes a signature log list and a certificate list; and the central processing unit registers, when the hysteresis signature is generated, from the generated hysteresis signature, the signature record in the signature log list and the user certificate in the certificate list such that the user certificate corresponds to the signature record;

retrieves a latest signature record out of the signature records registered in the signature log list;

for the signature records ranging from the retrieved signature records to a latest validated signature record, validates validity of the signature record and validity of a linkage relationship among the signature records with the user certificate registered in the certificate list;

acquires evidence information for proving validity of the user certificate, the evidence information including a public key certificate of a certificate authority which issued the user certificate and a certificate revocation list issued by the certificate authority; and validates the validity of the user certificate on the basis of the acquired evidence information.

2. The signature log storing apparatus as claimed in claim 1, wherein:

the storage unit further includes a trust point list for registering therein as trust point data, information including first identification information for identifying a latest validated signature record out of the signature records registered in the signature log list; and when the validity of the signature record and the user certificate of the signature records ranging from the latest signature record to the latest validated signature record is validated, the central processing unit registers in the trust point list as the trust point data, second identification information for identifying the latest signature record, the acquired evidence information, and a hash value of information derived by connecting the signature record identified by the second identification information and the evidence information.

3. The signature log storing apparatus as claimed in claim 2, wherein the central processing unit erases all user certificates registered in the certificate list when new trust point data is registered in the trust point list.

4. The signature log storing apparatus as claimed in either one of claim 2 or 3, wherein the central processing unit:

enters the hysteresis signature to be validated, trust point identification information for identifying one of pieces of the trust point data registered in the trust point list, and a public hash value previously opened as a hash value, included in the trust point data identified by the trust point identification information;

retrieves third identification information for identifying the signature record and the evidence information from the trust point data identified by the entered trust point identification information, and calculates a hash value of the information derived by connecting the signature record identified by the third identification information and the evidence information;

compares the calculated hash value and the entered public hash value;

validates the validity of the linkage relationship among the signature records ranging from the signature record identified by the third identification information to the signature record corresponding to the entered hysteresis signature; and compares the entered hysteresis signature and the signature record corresponding to the entered hysteresis signature, to validate the user certificate included in the entered hysteresis signature with the retrieved evidence information.

5. The signature log storing apparatus as claimed in claim 1, wherein the signature record includes a signature ID for identifying the hysteresis signature, and the signature ID includes information for identifying the signature log list.

6. The signature log storing apparatus as claimed in claim 5, wherein the storage unit includes a plurality of the signature log lists, and when the hysteresis signature is generated, the central processing unit identifies one of a plurality of the signature log lists with the signature ID included in the signature record out of the generated hysteresis signature, and registers the signature record in the identified signature log list.

7. The signature log storing apparatus as claimed in claim 6 wherein:

the central processing unit retrieves the latest signature record of each of the signature log lists out of the signature records registered in each of the signature log lists;

validates for the signature records ranging from the retrieved signature record to the signature record identified by the first identification information, validity of the latest signature record and validity of the linkage relationship of the signature records ranging from the latest signature record to the signature record identified by the first identification information for each signature log list using the user certificate registered in the certificate list;

acquires evidence information for proving validity of the user certificate;

validates the validity of the user certificate on the basis of the acquired evidence information; and registers a plurality of pieces of second identification information for identifying the latest signature record, the acquired evidence information, a hash value of information including a plurality of signature records identified by the second identification information and the evidence information in the trust point list as the trust point data.

8. The signature log storing apparatus as claimed in claim 7, wherein:

the central processing unit enters the hysteresis signature to be validated, the trust point identification information for identifying one of pieces of the trust point data registered in the trust point list; an opened public hash value as a hash value included in the trust point data identified by the trust point identification information;

retrieves a plurality of pieces of third identification information for identifying the signature record and the evidence information from the trust point data identified by the entered trust point identification information;

calculates a hash value of information derived by connecting the signature record identified by each of pieces of third identification information and the evidence information;

compares the calculated hash value and the entered public hash value;

validates the validity of the linkage relationship of the signature records ranging from the signature record identified by the third identification information to the signature record corresponding to the entered hysteresis signature;

compares the entered hysteresis signature and the signature record corresponding to the entered hysteresis signature; and validates the user certificate included in the entered hysteresis signature with the retrieved evidence information.

9. The signature log apparatus as claimed in claim 1, wherein the hysteresis signature is configured to include a timestamp issued by a third party and the evidence information includes information relating to the timestamp.

10. The signature log apparatus as claimed in claim 1, wherein the evidence information further includes at least one of an OCSP (Online Certificate Status Protocol) response, an ARL (Authority Revocation List), and a user certificate.

* * * * *